(12) United States Patent
Wang et al.

(10) Patent No.: US 9,643,318 B2
(45) Date of Patent: May 9, 2017

(54) TELEOPERATION OF MACHINES HAVING AT LEAST ONE ACTUATED MECHANISM

(71) Applicant: ABB Technology AG, Zurich (CH)

(72) Inventors: Jianjun Wang, West Hartford, CT (US); Biao Zhang, West Hartford, CT (US); George Q. Zhang, Windsor, CT (US); Harald Staab, Windsor, CT (US); Sangeun Choi, Simsbury, CT (US); Remus Boca, Simsbury, CT (US); Thomas A. Fuhlbrigge, Ellington, CT (US); Tomas Groth, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/648,995

(22) PCT Filed: Dec. 3, 2013

(86) PCT No.: PCT/US2013/072732
§ 371 (c)(1),
(2) Date: Jun. 2, 2015

(87) PCT Pub. No.: WO2014/088994
PCT Pub. Date: Jun. 12, 2014

(65) Prior Publication Data
US 2015/0298318 A1  Oct. 22, 2015

Related U.S. Application Data

(60) Provisional application No. 61/732,690, filed on Dec. 3, 2012.

(51) Int. Cl.
*G05B 19/04*  (2006.01)
*G05B 19/18*  (2006.01)
*B25J 9/16*  (2006.01)

(52) U.S. Cl.
CPC .......... *B25J 9/1689* (2013.01); *B25J 9/1676* (2013.01); *G05B 2219/40117* (2013.01); *G05B 2219/40131* (2013.01); *G05B 2219/40168* (2013.01)

(58) Field of Classification Search
CPC ................. B25J 9/1689; B25J 9/1676; G05B 2219/40117; G05B 2219/40131; G05B 2219/40168
See application file for complete search history.

(56) References Cited

U.S. PATENT DOCUMENTS

| | | | | |
|---|---|---|---|---|
| 5,266,875 A | * | 11/1993 | Slotine | B25J 9/1689 318/568.1 |
| 5,341,459 A | * | 8/1994 | Backes | B25J 9/1689 700/260 |

(Continued)

OTHER PUBLICATIONS

Turro, Haptically Augmented Teleoperation, May 2001, IEEE.*
Ruspini, The Haptic Display of Complex Graphical Environments, Aug. 1997, SIGGAPH.*

*Primary Examiner* — Nicholas Kiswanto
*Assistant Examiner* — Rachid Bendidi
(74) *Attorney, Agent, or Firm* — Taft Stettinius & Hollister LLP

(57) ABSTRACT

A machine that has at least one actuated mechanism is remotely located from a control station. A two way real-time communication link connects the machine location with the control station. An interface at the control station allows an operator to select one or more virtual constraints on operation of the machine when the machine is performing a predetermined function. The virtual constraints are transmitted over the two way real-time communication link to the machine location. The machine has predetermined safety limits that are stored in a controlling device at the machine location. The stored predetermined safety limits are (Continued)

extracted and automatically mapped to the control station using the two way real-time communication link. The controlling device maps the predetermined safety limits to the virtual constraints.

13 Claims, 5 Drawing Sheets

(56) References Cited

U.S. PATENT DOCUMENTS

| | | | | |
|---|---|---|---|---|
| 2003/0176948 A1* | 9/2003 | Green | ............... | A61B 34/77 700/264 |
| 2004/0167668 A1* | 8/2004 | Wang | ............... | H04N 7/142 700/248 |
| 2005/0104547 A1* | 5/2005 | Wang | ............... | B25J 19/023 318/568.2 |
| 2008/0065268 A1* | 3/2008 | Wang | ............... | B25J 9/1689 700/245 |
| 2009/0259339 A1* | 10/2009 | Wright | ............... | B25J 9/0003 700/264 |
| 2011/0218674 A1* | 9/2011 | Stuart | ............... | G06F 19/321 700/259 |
| 2013/0218336 A1* | 8/2013 | David | ............... | B25J 9/1671 700/248 |
| 2014/0094968 A1* | 4/2014 | Taylor | ............... | B25J 13/006 700/257 |

* cited by examiner

… (1)

TELEOPERATION OF MACHINES HAVING AT LEAST ONE ACTUATED MECHANISM

FIELD OF THE INVENTION

This invention relates to the teleoperation of one or more robots or other machines with at least one actuated mechanism.

DESCRIPTION OF THE PRIOR ART

Teleoperation of an industrial robot occurs when the operator of the teleoperated industrial robot is located apart from the robot when the industrial robot performs work. An industrial robot is an automatically controlled, reprogrammable, multipurpose manipulator programmable in three or more axes. Examples of industrial robots are robots located at a fixed position that are mobile by themselves or mobile because the robot is mounted on a device that it is itself mobile such as a motorized vehicle or mounted on a track or gantry etc.

By located apart from each other is meant that the operator and teleoperated industrial robot are either within the line of sight of each other or are separated from each other by a barrier through which the operator can see the robot that is controlled by the operator, or are at a distance from each other such that the operator cannot see the robot with his or her eyes. If there is a see through barrier, the barrier separates the operator from work performed by the robot that is hazardous to the health or safety of the operator.

The principal applications for teleoperated industrial robots are machining, handling of hazardous materials, assembling/disassembling, operation in a contaminated environment, inspection and service, or other operations in an unmanned, harsh outdoor environment such as offshore, desert, Arctic, Antarctic, subsea and space.

SUMMARY OF THE INVENTION

A system for teleoperation of a machine has at least one actuated mechanism and a predetermined number of degrees of freedom. The system comprises:

a control station remotely located from a location of the machine, the machine controlled from the control station to perform a predetermined function;

a two way real-time communication link between the machine and the remotely located control station; and an interface at the control station allowing an operator of the machine located at the control station to select one or more virtual constraints on operation of the machine to reduce the predetermined number of degrees of freedom when the machine is performing the predetermined function.

A system for teleoperation of a machine has at least one actuated mechanism and a predetermined number of degrees of freedom. The system comprises:

a control station remotely located from a location of the machine, the machine controlled from the control station to perform a predetermined function;

a two way real-time communication link between the machine and the remotely located control station; and a controlling device associated with the machine at the machine location, the machine having predetermined safety limits which are stored in the controlling device and the stored safety limits are extracted and automatically mapped to the control station using the two way real-time communication link to the control station.

A system for teleoperation of a machine has at least one actuated mechanism and a predetermined number of degrees of freedom. The system comprises:

a control station remotely located from a location of the machine, the machine controlled from the control station to perform a predetermined function;

a two way real-time communication link between the machine and the remotely located control station;

an interface at the control station allowing an operator of the machine located at the control station to select one or more virtual constraints on operation of the machine to reduce the predetermined number of degrees of freedom when the machine is performing the predetermined function, the virtual constraints transmitted over the two way real-time communication link to the machine location; and a controlling device associated with the machine at the machine location, the machine having predetermined safety limits which are stored in the controlling device, the controlling device mapping the predetermined safety limits to the virtual constraints transmitted to the machine location over the two way real-time communication link.

DETAILED DESCRIPTION

Figure 1:
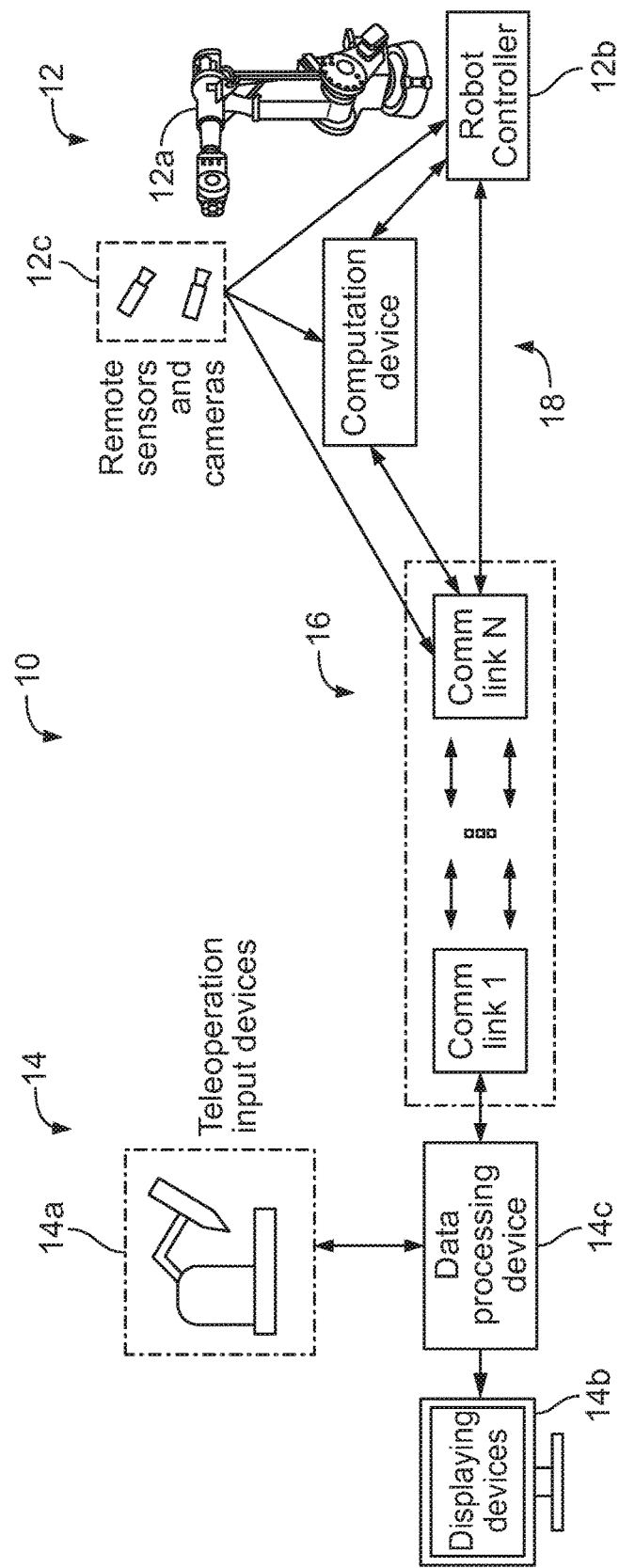
FIG. 1 shows an embodiment for a system for a teleoperated industrial robot.

Referring now to FIG. 1, there is shown a system 10 that has at least one remote robot station 12, at least one operator station 14 and at least one communication link 16 between the robot station 12 and the operator station 14. The physical distance between the remote robot station 12 and the operator station 14 can vary from "next door" to each other to "another continent".

The robot station 12 includes at least one robot 12a. Robot 12a is for example a six degree of freedom industrial robot available from ABB.

Robot station 12 also includes a robot controller 12b that includes a data interface which accepts motion commands and provides actual motion data, and optionally one or more remote sensor devices 12c that observe the robot station 12 and attached processes, such as cameras, microphones, position sensors, proximity sensors and force sensors. The sensor devices 12c may either be smart sensors, that is, the sensor device 12c includes data processing capability or not smart sensors, that is, the sensor device 12c does not include data processing capability.

If the sensor devices 12c are smart sensors then the output of the sensor devices is connected directly to robot controller 12b. If the sensor devices 12c are not smart sensors, then their output can be connected either to a computation device 18 to process the sensor device output or to the communication link 16 described in more detail below so that the sensor device output is processed in data processing device 14c.

The robot station 12 can also include as an option one or more actuators and other devices (not shown in FIG. 1 but well known to those of ordinary skill in this art), that are mounted to the robot or next to the robot, such as grippers, fixtures, welding guns, spraying guns, spotlights and conveyors.

The controller 12b has the program which when executed controls the motion of the robot 12a to perform work. As is well known, the robot may hold a tool, not shown, which is used to perform work on a stationary or moving workpiece, not shown, or may hold the workpiece which has work performed on it by an appropriate tool. The remote sensor devices 12c provide input signals to the controller 12b that the controller uses to control the robot 12a in performance of the work.

The operator station 14 has at least one teleoperation input device 14a such as joysticks or stylus-type devices which the operator uses to create continuous motion signals (position or speed signals). When force feedback is added to these devices they become haptic devices. This feedback causes a vibration in the joystick and the operator feels the force feedback in the stylus-type devices.

The signals from these input devices 14a are used by the controller 12b to operate the robot 12a. The device side also has at least one display device 14b and a data processing device 14c which is connected to both the input devices 14a and the display devices 14b.

The monitoring (display) device 14b shows actual data about the robot motion and attached processes, for example, camera images, acoustic feedback and sensor values. The data processing device 14c processes data in both directions. Device 14c may for example be an industrial PC or a PLC.

The operator station 14 may also include a safety enable device (not shown in FIG. 1) that is separate and distinct from input devices 14a and may for example be a three position switch. The safety enabling device enables and disables power to the robot 12a and attached processes.

The communication link 16 connects the robot controller 12b and the data processing device 14c to each other. The communication link 16 comprises one or more communication links 16-1 to 16-N.

The communication link 16 between the operator station 14 and the robot station 12 may be realized with various technologies (e.g. fiber-optic/radio/cable on different types and layers of data protocols). A major portion or the entire infrastructure of the communication link may already exist and be used for other purposes than teleoperating robots. Typical examples are existing Ethernet installations with LAN and WLAN, Bluetooth, ZigBee and other wireless industrial links, point-to-point radio systems or laser-optical systems, and satellite communication links.

System 10 is operated to maintain a reliable "real-time" communication link 16 between device side 14 and the remotely located robot side 12. The system 10 changes parameters of the communication link 16 and the robot motion, depending on the current available data rate and/or transmission time of the communication link 16.

In system 10, the operator has direct remote control of the motion of robot 12a and attached processes. Thus the term "real-time" as used herein is in the context of teleoperation of the motion of a robot 12a or a machine. The teleoperation is considered to be real-time if:

a maximum delay between operator commands, robot motion, and feedback about robot motion and attached processes at the operator station is not exceeded, and the maximum delay is dependent on the speed of machine motion, i.e. with slow machine motion a slightly longer delay is acceptable, and the maximum delay is deterministic, i.e. the delay time does not significantly vary over time.

Exceeding the maximum delay may result in damage to the workpiece or to the robot or other equipment on the robot side. For example, if the teleoperated robot is used in a grinding application and the communication delay exceeds the maximum delay, this will cause the operator to remove more material from the workpiece than desired. This excess removal of material can result in damage to the workpiece. Also for example, if the teleoperated robot is used in a material handling application, the communication delay exceeding the maximum delay will cause the collision between the robot 12a and other equipment on robot side.

This understanding of "real-time" is similar to real-time computation, where not only wrong results of logic and arithmetic operations can occur but also not timely results will cause errors.

As described above, robot 12a can have six or more degrees of freedom but it is difficult for a human operator to remotely control more than two degrees of freedom. Virtual constraints through haptic input device 14a are applied to reduce the degrees of freedom based on the task to be performed by robot 12a. However, there is not an easy and intuitive way for the operator to define and edit the virtual constraint in a teleoperated robot system.

Described in more detail below is a technique that allows the robot operator to define and edit the virtual constraint in a graphical user interface. This technique allows the operator to easily add, remove and modify the virtual constraint elements, such as a line, curve, surface or body, and combine the constraints to create the operator's movement, such as constrained movement, obstacle, robot workspace limits, etc. The operator also can select the types of the virtual constraint, such as position constraint, speed constraint and force/torque constraint, and specify the value and direction of the parameters in a virtual constraint.

Figure 2:
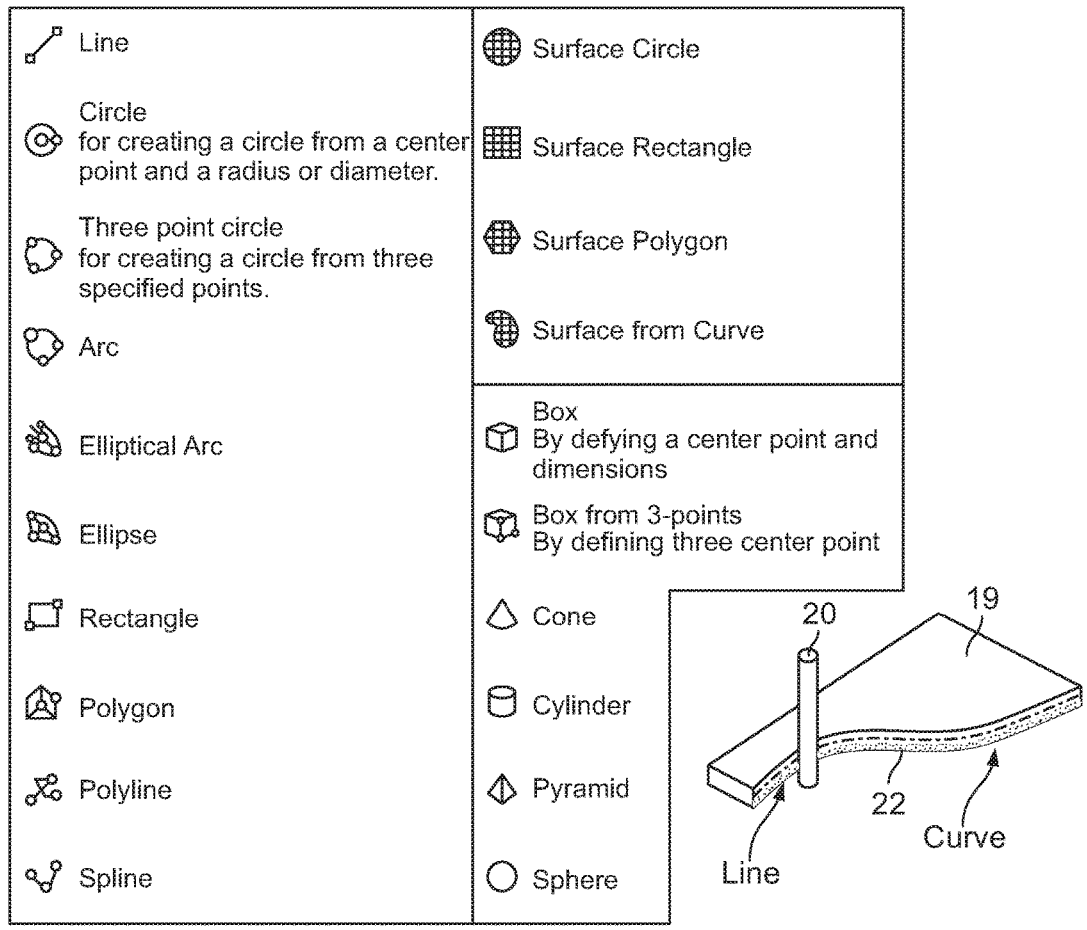
FIGS. 2 and 3 both show a simplified example of a tool held by robot that can be used to remove material from the edge of a part to be worked on by the tool.
Figure 3:
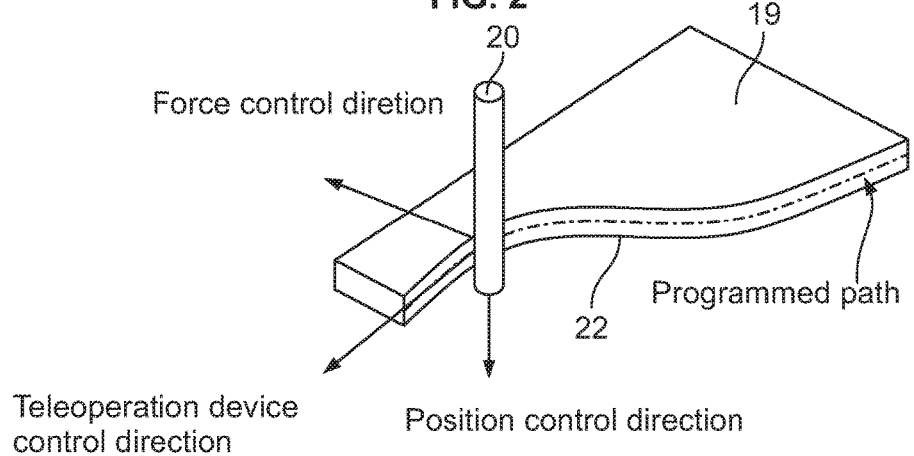

FIGS. 2 and 3 both show a simplified example of a tool 20 held by robot 12a that can be used to remove material from the edge 22 of a part 19 to be worked on by the tool.

To accomplish the material removal, the operator uses the teleoperation device 14a to move tool 20 along the edge 22. In order to assist the operator to easily remove the material from the edge 22 of the part 19, virtual constraints are created to limit the movement of the tool 20 along the programmed path.

As is shown in FIG. 2, the operator can select the virtual constraint elements in a graphic user interface (GUI) to define the constraints of tool movement. The virtual constraint elements shown in the GUI are, without limitation, line, curve, surface, body. As is also shown in FIG. 2, the path to be followed by the tool 20 to remove the material from the edge 22 of part 19 can include a line and a curve.

As shown in FIG. 3, in order to protect the part 19 and tool 20, the speed limit, position limit, contact force limit, teleoperation device control direction, force control direction, position control direction, orientation and position etc. also can be defined through the GUI.

The contact force limit is specified in the force control direction. The speed limit is defined in the teleoperation device control direction. The range of the orientation of the tool 20 is specified in the position control direction. Therefore, the tool 20 is only allowed to be teleoperated along a programmed path within the speed limit and the interference distance between the tool 20 and the part 19 is adjusted within a contact force limit.

Figure 4:
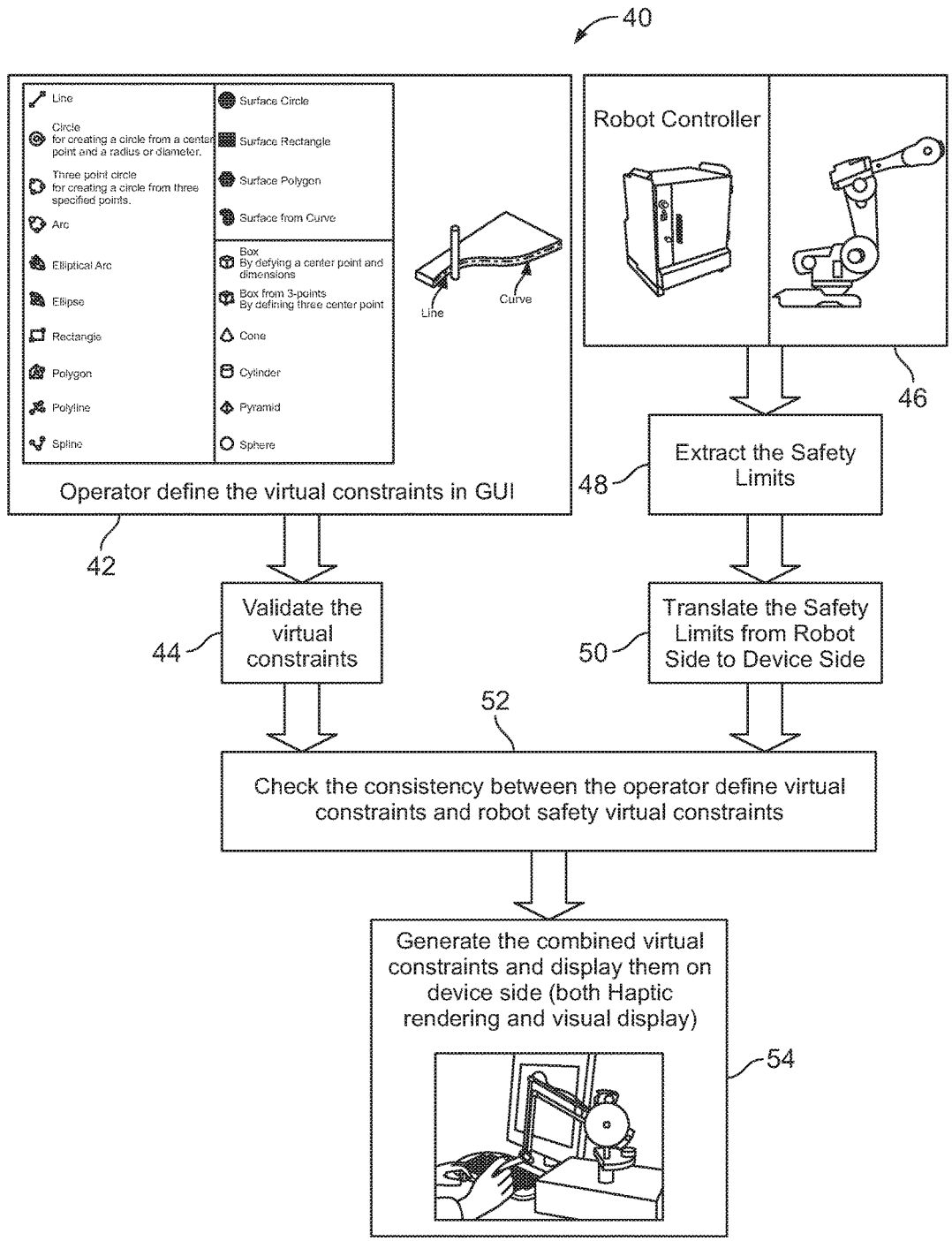
FIG. 4 shows a flow chart for virtual constraint editing using the GUI shown in FIGS. 2 and 3.

Referring now to FIG. 4, there is shown a flow chart 40 for virtual constraint editing using the GUI shown in FIG. 2. Block 42 of the flow chart 40 is FIG. 2. As shown in block 42, the operator defines the virtual constraints in the GUI by picking the applicable virtual constraints from a preloaded library of constraints. The operator can define a constraint and add it to the existing library of constraints. The operator defined constraint can be the combination of the basic constraints in the preloaded library.

At block 44, the defined virtual constraints are validated by the data processing device 14c shown in FIG. 1 on the device side 14. The validation determines if the virtual constraints defined by operator are within the teleoperation system capability, such as the maximum and minimum force, speed of the robot, etc.

Block 46 of the flow chart 40 shows the robot controller 12b and the robot 12a. Mechanical limits, position switches, and limit switches are used to limit a robot's joint rotation range when the robot is used to perform a particular function. Also in the robot/task level for safety supervision to prevent dangerous robot movement, there are speed limits, contact force limits/torque limits and safety/working/warning zones/world zone/dynamic zone. These zones and limits define the robot work area, forbidden area, slow down area, stop area, etc. These zones and limits are referred to hereinafter as "safety limits". The safety limits are normally defined in robot motion programs and configuration files running in the robot controller to ensure a high level of safety using supervision functions that can stop the robot.

At block 48, the safety limits are extracted from the robot 12a and controller 12b. At block 50, the safety limits are transferred from the robot side 12 to the device side 14 where the operator is located. Automatic mapping for the safety limits is described below.

At block 52, the data processing device 14c checks the consistency between the operator defined virtual constraints and the robot safety virtual constraints. The operator defined virtual constraints (path, area, force, speed, etc.), should be within the robot safety limits on the robot side 12. If the operator defined constraints are not within those limits an error message with a suggested solution is shown to the operator.

Figure 5:
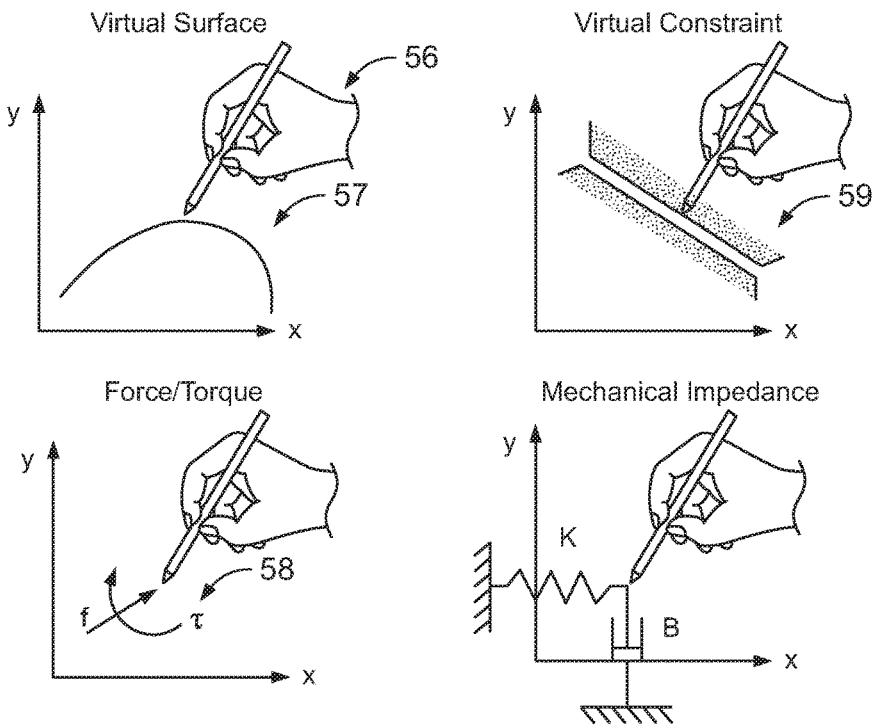
FIG. 5 shows four views for the use of a haptic device as the teleoperation input device.

At block 54, the combined consistency checked virtual constraints, that is, all of the operator designated constraints that have passed the consistency check, are displayed at the device side 14 both in haptic rendering and as a visual display. Haptic rendering, as is described in more detail below for FIG. 5, is the process of computing and generating forces in response to user interactions with virtual constraints via haptic device 14a.

As described above, the virtual constraints are used for the teleoperation of a remote industrial robot. It should be appreciated that the virtual constraints may also be used for the teleoperation of a remote mobile robot, a vehicle, or any other machine with at least one actuated mechanism. Example applications are: a robot, a vehicle or any other machine in an unmanned, harsh outdoor environment such as offshore, desert, Arctic, Antarctic, subsea, or outer space; or a robot in a contaminated environment.

It should be appreciated that the technique described above allows the operator to easily and conveniently define and modify the virtual constraints. By define is meant selecting the constraints from the library and defining the location of the virtual constraints with respect to real world objects, and defining the parameters of constraints, for example maximum force, torque, minimum and maximum speed, maximum distance from the constraint surface, etc. By modify is meant editing and changing the defined constraints before use. The teleoperator can also define and add customer constraints to the library that are combination of the constraints that are in the library.

It should also be appreciated that the described technique automatically validates the virtual constraints with the robot safety limits and automatically generates the combined virtual constraints and displays them on the device side 14 to the operator of the robot 12a.

In teleoperation of a robot, the safety limits are in the robot side 12. However, the operator who is located on the device side 14 does not have the safety limits information. This lack of safety limit information on the device side 14 causes the teleoperation to be interrupted due to safety supervision.

There is disclosed herein a method to automatically map the safety limits from the robot side 12 to the device side 14 to assist the operator in teleoperation of robot 12a.

Referring once again to FIG. 1, the controller 12b or other computing device that is used to control the operation of robot 12a is in charge of the safety supervision and safety limits on the robot side 12. The mechanism described below automatically maps the safety limits from the robot side 12 to the device side 14. The safety limits mapped into device side 14 can be used as virtual constraints through a haptic device 14a.

Referring now to FIG. 5, there are shown views for the use of a haptic device 14a. The upper left view shows there is a virtual surface generated by the haptic device 14a. As previously described, a haptic device does for the sense of touch what computer graphics do for vision. The operator represented by the hand 56 holds a haptic device pen 57 and can feel same the contact force as the stylus 58 of the pen 57 touches the real surface. The upper right view shows a virtual constraint generated by a haptic device 14a. The operator 56 can feel the stylus 58 constrained in a slot 59. The lower left view shows that the operator 56 holds a haptic device pen 57 and can feel the force and torque applied on the pen 57. The lower right view shows that the operator 56 can feel the resistance applied to the stylus 58 of the pen 57.

Referring once again to FIG. 1, the safety limits mapped into device side 14 can also be displayed on the monitor 14b to provide visual assistant and warning to operator in the teleoperation of robot 12a. Moreover the safety limits can be used to create the buffer between the work space and limit boundary. This will prevent the operator from teleoperating the robot 12a out of the safety limit and thus trigger the safety supervision.

For example, when the robot 12a teleoperated by the operator approaches the joint limit, the warning information is displayed on the monitor 14b. That information may include a suggestion to the operator to change the orientation of the tool used by the robot 12a to perform work based on the robot forward kinematics.

Figure 6:
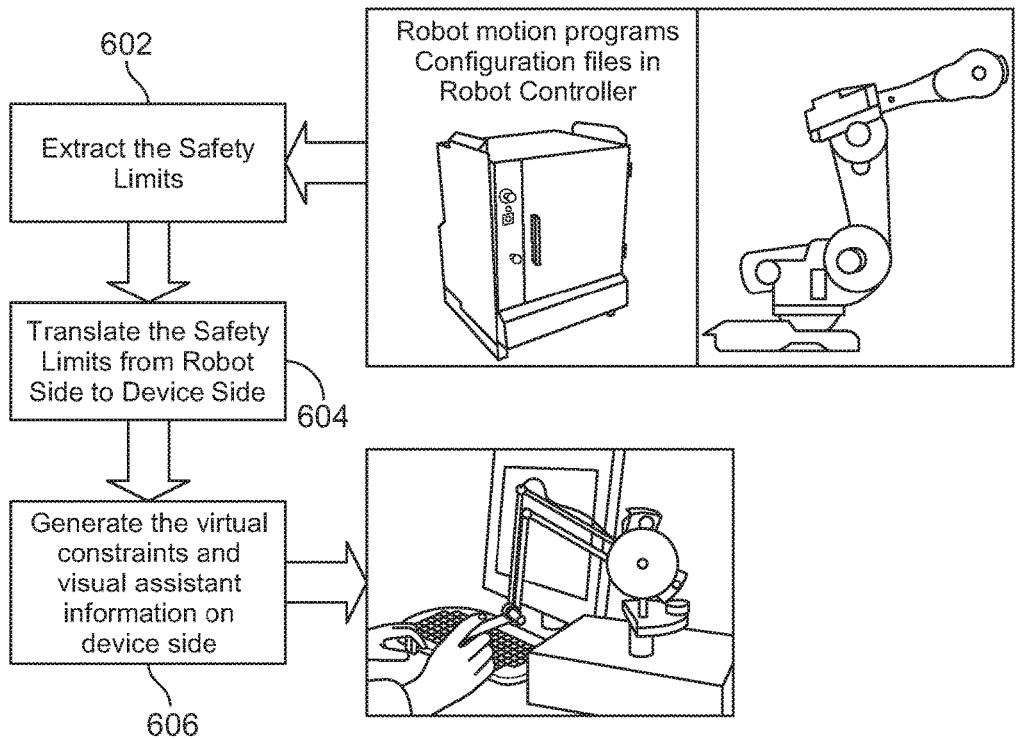
FIG. 6 shows a flowchart for the automatic mapping of safety limits for the haptic device shown in FIG. 5.

Referring now to FIG. 6, there is shown a revised FIG. 1 with the flowchart 600 for the automatic safety limits mapping of system 10. The first step 602 in flowchart 600 is to extract the safety limits from controller 12b. The next step 604 is to translate the safety limits from the robot side 12 to the device side 14. The third step 606 is to generate from the translated safety limits the virtual constraints and visual assistant information on the device side 14. While not shown in flowchart 600, the generated device side virtual constraints and visual assistant information may be displayed on monitor 14*b*.

Figure 7:
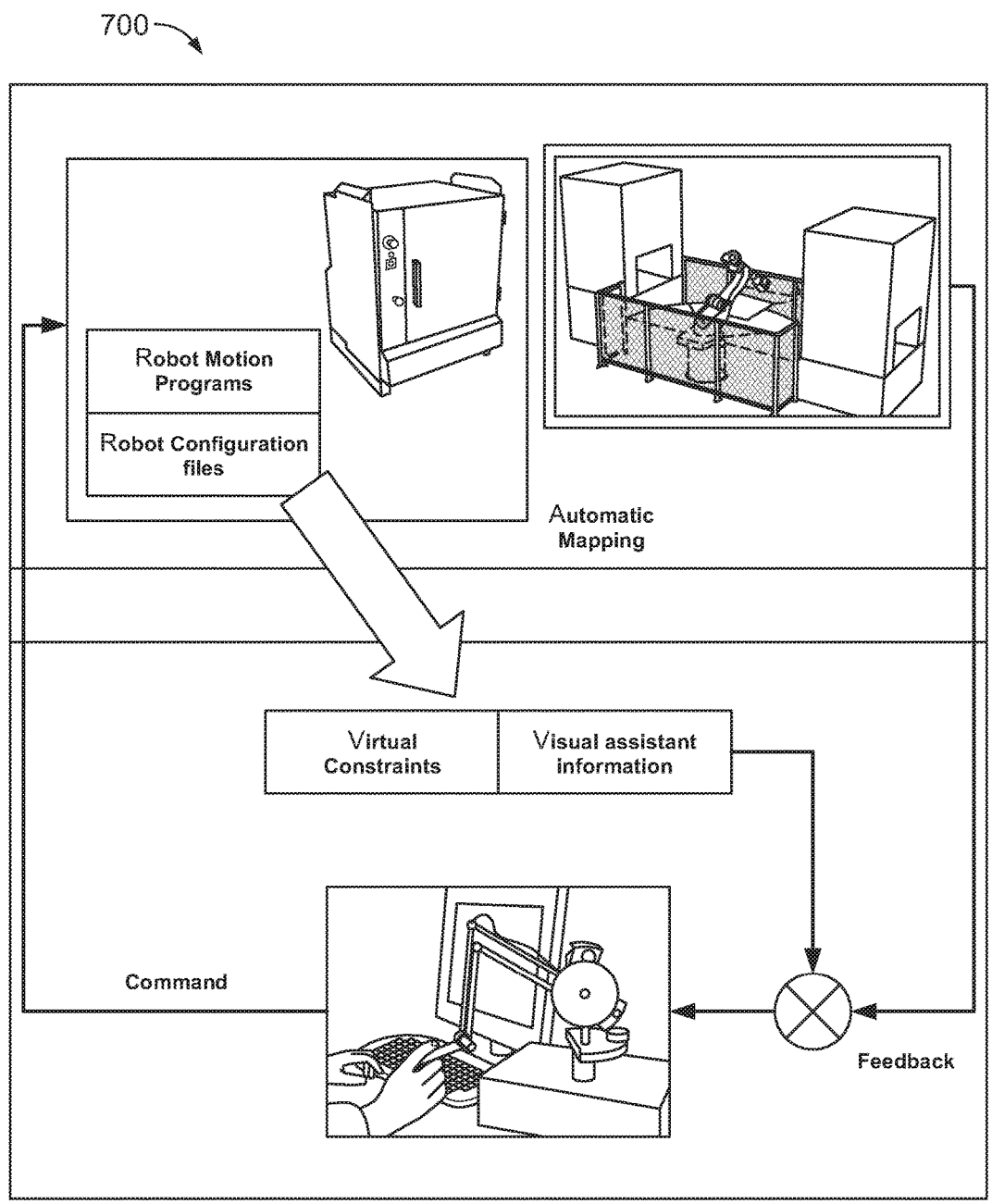
FIG. 7 shows a system in which robot configuration files are mapped to virtual constraints and virtual assistant information which is fed back to the teleoperator.

Referring now to FIG. 7, there is shown in its upper right corner a workcell 700 that has a robot, such as robot 12*b*, that performs a predetermined task that requires the robot be operated by an operator who is remotely located from the robot. This teleoperation of the robot 12*b* is shown in the bottom center of FIG. 7. The robot 12*b* provides feedback about its performance of the task and the robot itself to the teleoperator.

FIG. 7 shows in its upper left corner a controller such as controller 12*b* that has stored in it the robot motion programs and the robot configuration files. The safety limits in the robot motion programs and the configuration files are mapped to the virtual constraints and the virtual assistant information which are fed back to the operator. Using the feedback the operator sends commands to the controller 12*b*. For example, the difference zones ("A" and "B") in the upper right view in FIG. 7 can be mapped into the device side 14. The operator can feel the virtual constraints to control the robot movement within the specified area.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for teleoperation of a machine having at least one actuated mechanism and a predetermined number of degrees of freedom, said system comprising:
    a control station remotely located from a location of said machine, said machine controlled from said control station to perform a predetermined function;
    a two way real-time communication link between said machine and said remotely located control station;
    an interface at said control station allowing an operator of said machine located at said control station to select one or more virtual constraints on operation of said machine to reduce said predetermined number of degrees of freedom when said machine is performing said predetermined function; and
    a controlling device associated with said machine at said machine location, said machine having predetermined safety limits which are stored in said controlling device, said stored predetermined safety limits are extracted and transmitted to said control station over said two way real-time communication link and automatically mapped to said virtual constraints.

2. The system of claim 1 wherein said two way real-time communication link is a wired link or a wireless link.

3. The system of claim 1 wherein said one or more virtual constraints can be modified by selecting virtual constraints from a library of virtual constraints.

4. The system of claim 3 wherein operator defined constraints can be added into said library.

5. The system of claim 4 wherein said operator defined constraints are a combination of two or more of said one or more constraints in said library.

6. The system of claim 4 wherein said system has a predetermined capability and said operator defined constraints are evaluated at said control station to determine if said operator defined constraints are within said machine predetermined capability.

7. The system of claim 4 wherein said machine has predetermined safety limits which are stored in a controlling device at said machine location and said stored predetermined safety limits are extracted and automatically mapped to said control station and a consistency check is performed at said control station between said operator defined virtual constraints and said mapped predetermined safety limits.

8. The system of claim 7 wherein an error message is displayed at said control station with a suggested solution when said consistency check performed at said control station between said operator defined virtual constraints and said mapped predetermined safety limits is not within said machine predetermined safety limits.

9. The system of claim 1 wherein said mapping of said predetermined safety limits to said virtual constraints is transmitted to said control station for use by an operator of said machine located at said control station to provide commands to said machine location to thereby control said machine to perform said predetermined function.

10. The system of claim 9 wherein said control station has a haptic device configured for generating forces in response to operator interactions with said transmitted virtual constraints.

11. A system for teleoperation of a machine having at least one actuated mechanism and a predetermined number of degrees of freedom, said system comprising:
    a control station remotely located from a location of said machine, said machine controlled from said control station to perform a predetermined function;
    a two way real-time communication link between said machine and said remotely located control station;
    an interface at said control station allowing an operator of said machine located at said control station to select one or more of virtual constraints on operation of said machine to reduce said predetermined number of degrees of freedom when said machine is performing said predetermined function; and
    a controlling device associated with said machine at said machine location, said machine having predetermined safety limits which are stored in said controlling device, and said stored predetermined safety limits are extracted and transmitted via the two-way real time communication link to the control station, wherein a consistency check is performed between said predetermined safety limits and said selected one or more virtual constraints and said predetermined safety limits are automatically mapped to said control station.

12. The system of claim 11 wherein a data processing device in said control station generates virtual constraints on operation of said machine from said predetermined safety limits automatically mapped to said control station.

13. The system of claim 12 wherein said control station has a haptic device configured for generating forces in response to operator interactions with said generated virtual constraints.

* * * * *